(12) United States Patent
Ma et al.

(10) Patent No.: US 9,109,073 B1
(45) Date of Patent: *Aug. 18, 2015

(54) BIFUNCTIONALIZED POLYMER

(71) Applicant: The Goodyear Tire & Rubber Company, Akron, OH (US)

(72) Inventors: Liqing Ma, Uniontown, OH (US); Paul Harry Sandstrom, Cuyahoga Falls, OH (US); Arindam Mazumdar, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,967

(22) Filed: Aug. 19, 2014

(51) Int. Cl.
*C08F 136/00* (2006.01)
*C08F 36/08* (2006.01)
*C08F 12/08* (2006.01)
*C08F 36/06* (2006.01)

(52) U.S. Cl.
CPC ............... *C08F 36/08* (2013.01); *C08F 12/08* (2013.01); *C08F 36/06* (2013.01)

(58) Field of Classification Search
None
See application file for complete search history.

(56) References Cited

U.S. PATENT DOCUMENTS

| | | | |
|---|---|---|---|
| 4,935,471 A | 6/1990 | Halasa et al. | |
| 5,128,416 A * | 7/1992 | Imai et al. | 525/254 |
| 5,332,810 A | 7/1994 | Lawson et al. | |
| 5,508,333 A | 4/1996 | Shimizu | |
| 5,552,473 A | 9/1996 | Lawson et al. | |
| 5,574,109 A | 11/1996 | Lawson et al. | |
| 5,605,872 A | 2/1997 | Engel et al. | |
| 5,610,237 A | 3/1997 | Lawson et al. | |
| 5,616,704 A | 4/1997 | Lawson et al. | |
| 5,625,017 A * | 4/1997 | Morita et al. | 526/180 |
| 5,785,778 A | 7/1998 | Lawson et al. | |
| 5,786,441 A | 7/1998 | Lawson et al. | |
| 5,798,418 A | 8/1998 | Quirk | |
| 5,866,650 A | 2/1999 | Lawson et al. | |
| 5,912,313 A * | 6/1999 | McIntosh et al. | 526/279 |
| 5,919,870 A | 7/1999 | Letchford et al. | |
| 6,025,450 A | 2/2000 | Lawson et al. | |
| 6,080,835 A | 6/2000 | Lawson et al. | |
| 6,349,753 B1 | 2/2002 | Lawson et al. | |
| 7,202,306 B2 * | 4/2007 | Tanaka et al. | 525/331.9 |
| 8,252,863 B2 | 8/2012 | Hasse et al. | |
| 8,952,101 B2 * | 2/2015 | Sasajima et al. | 525/342 |
| 2002/0137843 A1 * | 9/2002 | Kwag et al. | 525/100 |
| 2006/0004143 A1 * | 1/2006 | Inagaki et al. | 525/192 |
| 2007/0049669 A1 * | 3/2007 | Korth et al. | 524/188 |
| 2008/0103261 A1 * | 5/2008 | Tanaka et al. | 525/331.9 |
| 2008/0177017 A1 * | 7/2008 | Suzuki et al. | 526/310 |
| 2011/0054095 A1 * | 3/2011 | Yukimura et al. | 524/188 |
| 2011/0091708 A1 * | 4/2011 | Noda et al. | 428/220 |
| 2011/0251308 A1 | 10/2011 | Galvan et al. | |
| 2012/0041134 A1 * | 2/2012 | Ito et al. | 524/547 |
| 2012/0041135 A1 * | 2/2012 | Ito et al. | 524/547 |
| 2012/0252966 A1 * | 10/2012 | Ito | 524/575 |
| 2012/0270997 A1 * | 10/2012 | Tanaka et al. | 524/572 |

\* cited by examiner

Primary Examiner — Robert S Loewe
(74) Attorney, Agent, or Firm — John D. DeLong

(57) ABSTRACT

The present invention is directed to a bifunctionalized elastomer comprising the reaction product of (1) a living anionic elastomeric polymer initiated with a functional initiator and (2) a functional polymerization terminator.

16 Claims, No Drawings

BIFUNCTIONALIZED POLYMER

BACKGROUND OF THE INVENTION

In recent years, there is a growing demand for functionalized polymers. Functionalized polymers can be synthesized through various living/controlled polymerization techniques. In the living polymerization process based on active carbanionic center, metals from Groups I and II of the periodic table are commonly used to initiate the polymerization of monomers into polymers. For example, lithium, barium, magnesium, sodium, and potassium are metals that are frequently utilized in such polymerizations. Initiator systems of this type are of commercial importance because they can be used to produce stereo regulated polymers. For instance, lithium initiators can be utilized to initiate the anionic polymerization of isoprene into synthetic polyisoprene rubber or to initiate the polymerization of 1,3-butadiene into polybutadiene rubber having the desired microstructure.

The polymers formed in such polymerizations have the metal used to initiate the polymerization at the growing end of their polymer chains and are sometimes referred to as living polymers. They are referred to as living polymers because their polymer chains which contain the terminal metal initiator continue to grow or live until all of the available monomer is exhausted. Polymers that are prepared by utilizing such metal initiators normally have structures which are essentially linear and normally do not contain appreciable amounts of branching.

This invention details synthesis of functionalized polymers. In general to achieve the best tire performance properties functionalized polymers are highly desirable. In order to reduce the rolling resistance and to improve the tread wear characteristics of tires, functionalized elastomers having a high rebound physical property (low hysteresis) have been used for the tire tread rubber compositions. However, in order to increase the wet skid resistance of a tire tread, rubbery polymers that have a relatively lower rebound physical property (higher hysteresis) which thereby undergo a greater energy loss, have sometimes been used for such tread rubber compositions. To achieve such relatively inconsistent viscoelastic properties for the tire tread rubber compositions, blends (mixtures) of various types of synthetic and natural rubber can be utilized in tire treads.

Functionalized rubbery polymers made by living polymerization techniques are typically compounded with sulfur, accelerators, antidegradants, a filler, such as carbon black, silica or starch, and other desired rubber chemicals and are then subsequently vulcanized or cured into the form of a useful article, such as a tire or a power transmission belt. It has been established that the physical properties of such cured rubbers depend upon the degree to which the filler is homogeneously dispersed throughout the rubber. This is in turn related to the level of affinity that filler has for the particular rubbery polymer. This can be of practical importance in improving the physical characteristics of rubber articles which are made utilizing such rubber compositions. For example, the rolling resistance and traction characteristics of tires can be improved by improving the affinity of carbon black and/or silica to the rubbery polymer utilized therein. Therefore, it would be highly desirable to improve the affinity of a given rubbery polymer for fillers, such as carbon black and silica.

In tire tread formulations, better interaction between the filler and the rubbery polymer results in lower hysteresis and consequently tires made with such rubber formulations have lower rolling resistance and in some cases improved tread wear. Low tan delta values at 60° C. are indicative of low hysteresis and consequently tires made utilizing such rubber formulations with low tan delta values at 60° C. normally exhibit lower rolling resistance. Better interaction between the filler and the rubbery polymer in tire tread formulations also typically results in higher tan delta values at 0° C. which is indicative of better traction characteristics.

The interaction between rubber and carbon black has been attributed to a combination of physical absorption (van der Waals force) and chemisorption between the oxygen containing functional groups on the carbon black surface and the rubber (see D. Rivin, J. Aron, and A. Medalia, Rubber Chem. & Technol. 41, 330 (1968) and A. Gessler, W. Hess, and A Medalia, Plast. Rubber Process, 3, 141 (1968)). Various other chemical modification techniques, especially for styrene-butadiene rubber made by solution polymerization (S-SBR), have also been described for reducing hysteresis loss by improving polymer-filler interactions. In one of these techniques, the solution rubber chain end is modified with aminobenzophenone. This greatly improves the interaction between the polymer and the oxygen-containing groups on the carbon black surface (see N. Nagata, Nippon Gomu Kyokaishi, 62, 630 (1989)). Tin coupling of anionic solution polymers is another commonly used chain end modification method that aids polymer-filler interaction supposedly through increased reaction with the quinone groups on the carbon black surface. The effect of this interaction is to reduce the aggregation between carbon black particles which in turn, improves dispersion and ultimately reduces hysteresis. Functionalization of a solution polymerized rubber chain end using a functionalized lithium initiator may also be used.

SUMMARY OF THE INVENTION

The subject invention provides for the end-group functionalization of rubbery living polymers to improve their affinity for fillers, such as carbon black and/or silica. Such functionalized polymers can be beneficially used in manufacturing tires and other rubber products where improved polymer/filler interaction is desirable. In tire tread compounds this can result in lower polymer hysteresis which in turn can provide a lower level of tire rolling resistance.

The present invention is directed to a bifunctionalized elastomer comprising the reaction product of 1) a living anionic elastomeric polymer initiated with a functional initiator and 2) a functional polymerization terminator, wherein 1) the living anionic elastomeric polymer initiated with a functional initiator is of formula AYLi where Y is a divalent polymer radical, Li is a lithium atom bonded to a carbon atom of Y, and A is an amine-containing radical having the formula X

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and 2) the functional polymerization terminator is of formula I

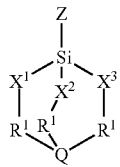

wherein $R^1$ is C1 to C4 linear alkyl, or C1 to C4 branched alkanediyl; $X^1$, $X^2$, $X^3$ are independently O, S, or a group of formula (II) or (III)

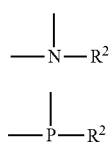

where $R^2$ is C1 to C18 linear or branched alkyl; Z is $R^3$, $-OR^4$, or $-R^5-X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

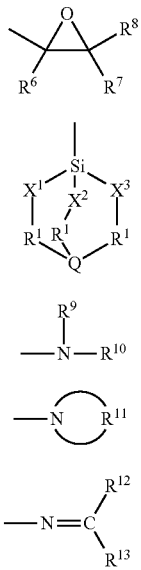

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl;
Q is N or a group of structure IX

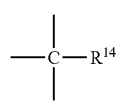

wherein $R^{14}$ is C1 to C8 alkyl.

DETAILED DESCRIPTION OF THE INVENTION

There is disclosed a bifunctionalized elastomer comprising the reaction product of 1) a living anionic elastomeric polymer initiated with a functional initiator and 2) a functional polymerization terminator, wherein
1) the living anionic elastomeric polymer initiated with a functional initiator is of formula AYLi where Y is a divalent polymer radical, Li is a lithium atom bonded to a carbon atom of Y, and A is an amine-containing radical having the formula X

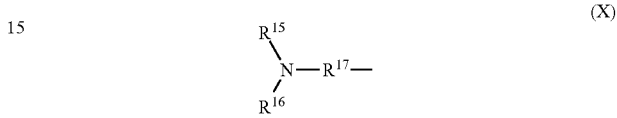

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and
2) the functional polymerization terminator is of formula I

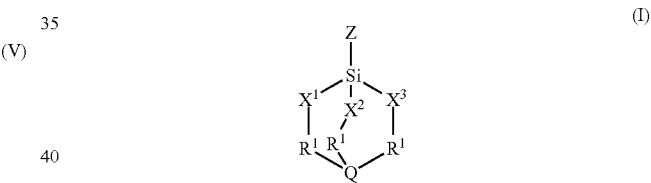

wherein $R^1$ is C1 to C4 linear alkyl, or C1 to C4 branched alkanediyl; $X^1$, $X^2$, $X^3$ are independently O, S, or a group of formula (II) or (III)

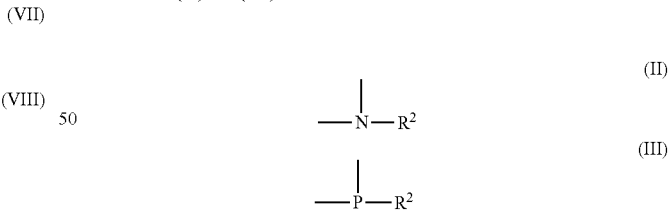

where $R^2$ is C1 to C18 linear or branched alkyl; Z is $R^3$, $-OR^4$, or $-R^5-X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

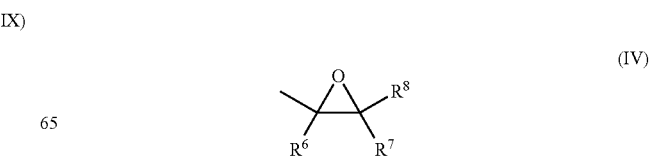

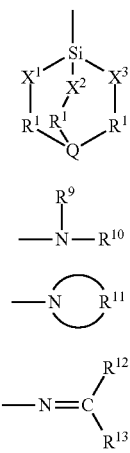

(V)

(VI)

(VII)

(VIII)

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl; Q is N or a group of structure IX

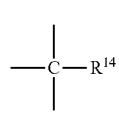

(IX)

wherein $R^{14}$ is C1 to C8 alkyl.

The subject invention provides a means for the end-group bifunctionalization of rubbery living polymers to improve their affinity for fillers, such as carbon black and/or silica, through use of both a functional polymerization initiator and a functional polymerization terminator. The process of the present invention can be used to functionalize any living polymer which is terminated with a metal of group I or II of the periodic table. These polymers can be produced utilizing techniques that are well known to persons skilled in the art. The metal terminated rubbery polymers that can be functionalized with a terminator of formula I in accordance with this invention can be made utilizing monofunctional initiators having the general structural formula P-M, wherein P represents a polymer chain and wherein M represents a metal of group I or II.

The initiator used to initiate the polymerization employed in synthesizing the living rubbery polymer that is functionalized in accordance with this invention is typically selected from the group consisting of barium, lithium, magnesium, sodium, and potassium. Lithium and magnesium are the metals that are most commonly utilized in the synthesis of such metal terminated polymers (living polymers). Normally, lithium initiators are more preferred.

Organolithium compounds are the preferred initiators for utilization in such polymerizations. The organolithium compounds which are utilized as initiators are normally organo monolithium compounds. The organolithium compounds which are preferred as initiators are monofunctional compounds which can be represented by the formula: R—Li, wherein R represents a hydrocarbyl radical. In the present invention, polymerization of a monomer in the presence of the initiator forms a living anionic elastomeric polymer of formula AYLi where Y is a divalent polymer radical, Li is a lithium atom bonded to a carbon atom of Y, and A is an amine-containing radical having the formula X

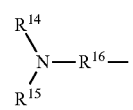

(X)

wherein $R^{14}$ and $R^{15}$ independently have from 1 to 20 carbon atoms and each are independently an alkyl group, a cycloalkyl group, an aromatic group, a substituted alkyl group, a substituted cycloalkyl group or a substituted aromatic group, or $R^{14}$ and $R^{15}$ taken together with the nitrogen to which both $R^{14}$ and $R^{15}$ are attached comprise a heterocyclic amine group wherein $R^{14}$ and $R^{15}$ taken together form an alkanediyl group of from 4 to 20 carbon atoms or a substituted alkanediyl group of from 4 to 20 carbon atoms, and $R^{16}$ is a covalent bond, an alkanediyl group of from 1 to 20 carbon atoms or a substituted alkanediyl group of from 1 to 20 carbon atoms. Thus the initiator is of formula R—Li with R replaced by the structure of formula X.

In one embodiment, the organolithium initiator is an N,N-dialkylamino alkyllithium such as 3-(N,N-dimethylamino)-1-propyllithium, 3-(N,N-dimethylamino)-2-methyl-1-propyllithium, 3-(N,N-dimethylamino)-2,2-dimethyl-1-propyllithium, 4-(N,N-dimethylamino)-1-butyllithium, 5-(N,N-dimethylamino)-1-pentyllithium, 6-(N,N-dimethylamino)-1-hexyllithium, 8-(N,N-dimethylamino)-1-propyllithium, and the like. Correspondingly in this embodiment, in formula X the group structure is N, N-dialkylamino alkyl such as 3-(N,N-dimethylamino)-1-propyl, 3-(N,N-dimethylamino)-2-methyl-1-propyl, 3-(N,N-dimethylamino)-2,2-dimethyl-1-propyl, 4-(N,N-dimethylamino)-1-butyl, 5-(N,N-dimethylamino)-1-pentyl, 6-(N,N-dimethylamino)-1-hexyl, 8-(N,N-dimethylamino)-1-propyl, and the like.

In one embodiment, the organolithium initiator is an aza-cycloalkyl alkyllithium such as 3-piperidino-1-propyllithium, 3-pyrrolidino-1-propyllithium, and the like. Correspondingly in this embodiment, in formula X the group structure is 3-piperidino-1-propyl, 3-pyrrolidino-1-propyl, and the like. In one embodiment, the group is 3-pyrrolidino-1-propyl and the initiator is 3-pyrrolidino-1-propyllithium.

The amount of organolithium initiator utilized will vary depending upon the molecular weight which is desired for the rubbery polymer being synthesized as well as the precise polymerization temperature which will be employed. The precise amount of organolithium compound required to produce a polymer of a desired molecular weight can be easily ascertained by persons skilled in the art. However, as a general rule from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

Many types of unsaturated monomers which contain carbon-carbon double bonds can be polymerized into polymers using such metal catalysts. Elastomeric or rubbery polymers can be synthesized by polymerizing diene monomers utilizing this type of metal initiator system. The diene monomers that can be polymerized into synthetic rubbery polymers can be either conjugated or nonconjugated diolefins. Conjugated diolefin monomers containing from 4 to 8 carbon atoms are generally preferred. Vinyl-substituted aromatic monomers can also be copolymerized with one or more diene monomers into rubbery polymers, for example styrene-butadiene rubber (SBR). Some representative examples of conjugated diene monomers that can be polymerized into rubbery polymers include 1,3-butadiene, isoprene, 1,3-pentadiene, 2,3-dimethyl-1,3-butadiene, 2-methyl1,3-pentadiene, 2,3-dimethyl-1,3-pentadiene, 2-phenyl-1,3-butadiene, and 4,5-diethyl-1,3-octadiene. Some representative examples of vinyl-substituted aromatic monomers that can be utilized in the synthesis of rubbery polymers include styrene, 1-vinylnapthalene, 3-methylstyrene, 3,5-diethylstyrene, 4-propylstyrene, 2,4,6-trimethylstyrene, 4-dodecylstyrene, 3-methyl-5-normal-hexyl-styrene, 4-phenylstyrene, 2-ethyl-4-benzylstyrene, 3,5-diphenylstyrene, 2,3,4,5-tetraethylstyrene, 3-ethyl-1-vinylnapthalene, 6-isopropyl-1-vinylnapthalene, 6-cyclohexyl-1-vinylnapthalene, 7-dodecyl-2-vinylnapthalene, α-methylstyrene, and the like.

The metal terminated rubbery polymers that are functionalized with a terminator of formula I in accordance with this invention are generally prepared by solution polymerizations that utilize inert organic solvents, such as saturated aliphatic hydrocarbons, aromatic hydrocarbons, or ethers. The solvents used in such solution polymerizations will normally contain from about 4 to about 10 carbon atoms per molecule and will be liquids under the conditions of the polymerization. Some representative examples of suitable organic solvents include pentane, isooctane, cyclohexane, normal-hexane, benzene, toluene, xylene, ethylbenzene, tetrahydrofuran, and the like, alone or in admixture. For instance, the solvent can be a mixture of different hexane isomers. Such solution polymerizations result in the formation of a polymer cement (a highly viscous solution of the polymer).

The metal terminated living rubbery polymers utilized in the practice of this invention can be of virtually any molecular weight. However, the number average molecular weight of the living rubbery polymer will typically be within the range of about 50,000 to about 500,000. It is more typical for such living rubbery polymers to have number average molecular weights within the range of 100,000 to 250,000.

The metal terminated living rubbery polymer can be functionalized by simply adding a stoichiometric amount of a terminator of formula I to a solution of the rubbery polymer (a rubber cement of the living polymer). In other words, approximately one mole of the terminator of formula I is added per mole of terminal metal groups in the living rubbery polymer. The number of moles of metal end groups in such polymers is assumed to be the number of moles of the metal utilized in the initiator. It is, of course, possible to add greater than a stoichiometric amount of the terminator of formula I. However, the utilization of greater amounts is not beneficial to final polymer properties. Nevertheless, in many cases it will be desirable to utilize a slight excess of the terminator of formula I to insure that at least a stoichiometric amount is actually employed or to control the stoichiometry of the functionalization reaction. In most cases from about 1.2 to about 2 moles of the terminator of formula I will be utilized per mole of metal end groups in the living polymer being treated. In the event that it is not desired to functionalize all of the metal terminated chain ends in a rubbery polymer then, of course, lesser amounts of the terminator of formula I can be utilized.

The terminator of formula I will react with the metal terminated living rubbery polymer over a very wide temperature range. For practical reasons the functionalization of such living rubbery polymers will normally be carried out at a temperature within the range of 0° C. to 150° C. In order to increase reaction rates, in most cases it will be preferred to utilize a temperature within the range of 20° C. to 100° C. with temperatures within the range of 50° C. to 80° C. being most preferred. The capping reaction is very rapid and only very short reaction times within the range of 0.1 to 2 hours are normally required. However, in some cases reaction times of up to about 24 hours may be employed to insure maximum conversions.

In one embodiment, the terminator of formula I has one of the structures shown in Table 1.

TABLE 1

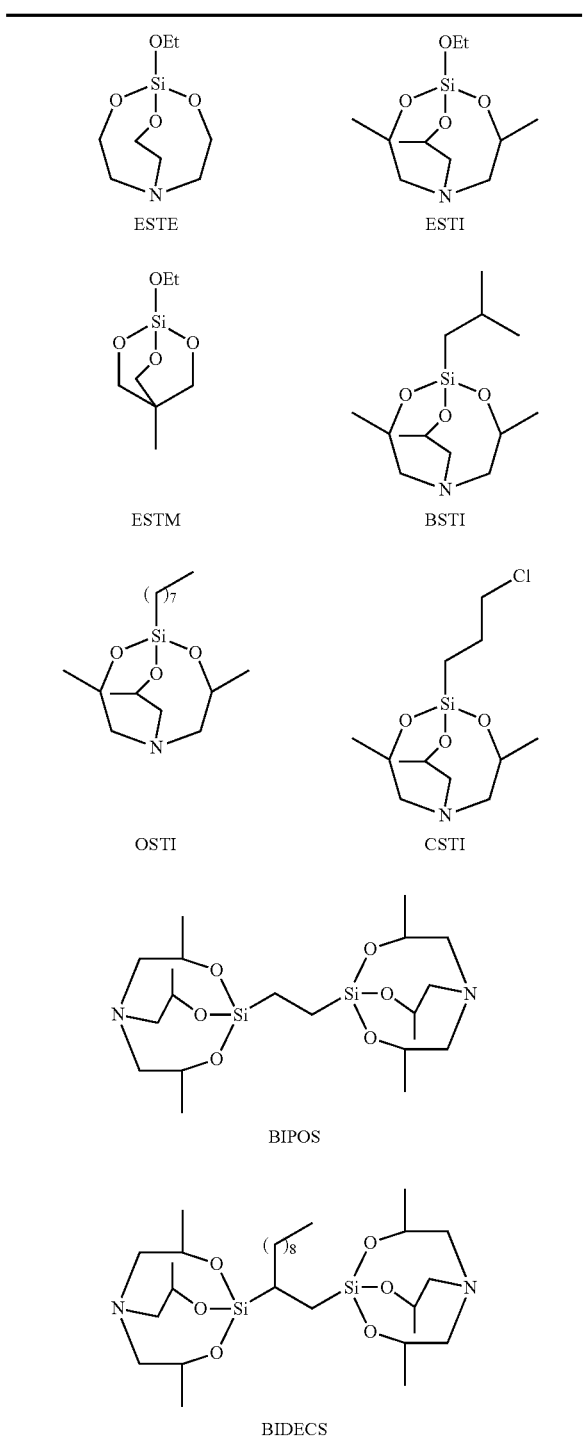

TABLE 1-continued

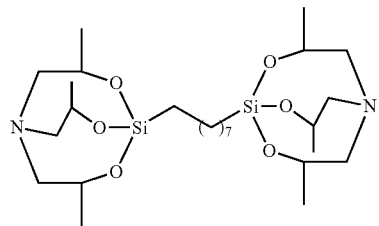

BIOCTS

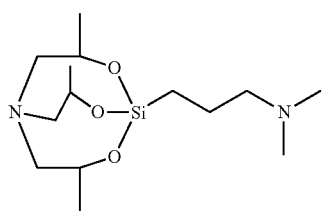 [SMILES: CC1CN2CC(C)O[Si](CCCN(C)C)(O1)OC(C)C2]

DMASTI

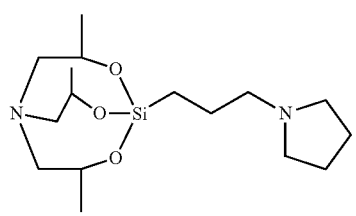 [SMILES: CC1CN2CC(C)O[Si](CCCN3CCCC3)(O1)OC(C)C2]

PYSTI

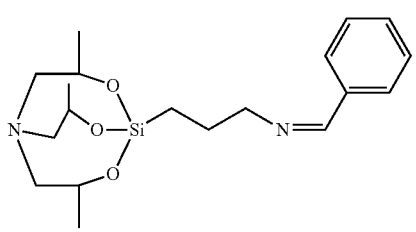

BIMSTI

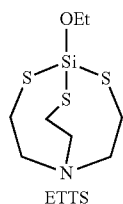

ETTS

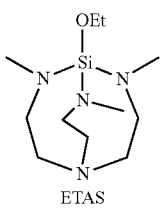

ETAS

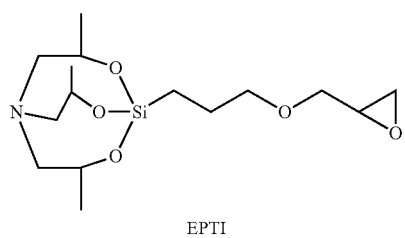

EPTI

ESTE: 1-ethoxy-2,8,9-trioxa-5-aza-l-silabicyclo[3.3.3]undecane, or ethoxysilatrane
ESTI: 1-ethoxy-3,7,10-trimethyl-2,8,9-trioxa-5-aza-l-silabicyclo 1-[3.3.3]undecane, or ethoxy-3,7,10-trimethylsilatrane
ESTM: 1-ethoxy-4-methyl-2,6,7-trioxa-1-silabicyclo[2.2.2]octane
BSTI: 1-isobutyl-3,7,10-trimethyl-2,8,9-trioxa-5-aza-l-silabicyclo [3.3.3]undecane, or 1-isobutyl-3,7,10-trimethylsilatrane
OSTI: 1-octyl-3,7,10-trimethyl-2,8,9-trioxa-5-aza-l-silabicyclo TABLE 1-continued

[3.3.3]undecane, or 1-octyl-3,7,10-trimethylsilatrane
CSTI: 1-(3-chloropropyl)-3,7,10-trimethyl-2,8,9-trioxa-5-aza-1-silabicyclo[3.3.3]undecane, or 1-(3-chloropropyl)-3,7,10-trimethylsilatrane
BIPOS: 1,2-bis(3,7,10-trimethyl-2,8,9-trioxa-5-aza-1-silabicyclo [3.3.3]undecan-l-yl)ethane, or 1,2-bis(3,7,10-trimethylsilatrane)ethane
BIDECS: 1,1'-(decane-1,2-diyl)bis(3,7,10-trimethyl-2,8,9-trioxa-5-aza-1-silabicyclo[3.3.3]undecane) , or 1,1'-(decane-1,2-diyl)bis(3,7,10-trimethylsilatrane)
BIOCTS: 1,8-bis(3,7,10-trimethyl-2,8,9-trioxa-5-aza-1-silabicyclo [3.3.3]undecan-l-yl)octane, or 1,8-bis(3,7,10-trimethylsilatrane)octane
DMASTI: N,N-dimethyl-3-(3,7,10-trimethyl-2,8,9-trioxa-5-aza-1-silabicyclo[3.3.3]undecan-1-yl)propan-1-amine
PYSTI: 3,7,10-trimethyl-1-(3-(pyrrolidin-l-yl)propyl)-2,8,9-trioxa-5-aza-1-silabicyclo[3.3.3]undecane
BIMSTI: N-benzylidene-3-(3,7,10-trimethyl-2,8,9-trioxa-5-aza-l-silabicyclo[3.3.3]undecan-l-yl)propan-l-amine
ETTS: 1-ethoxy-2,8,9-trithia-5-aza-l-silabicyclo[3.3.3]undecane; or 1-ethoxy-thiosilitrane
ETAS: 1-ethoxy-2,8,9-trimethyl-2,5,8,9-tetraaza-l-silabicyclo [3.3.3]undecane; or 1-ethoxy-2,8,9-triazasilatrane
EPTI: 3,7,10-trimethyl-1-(3-(oxiran-2-ylmethoxy)propyl)-2,8,9-trioxa-5-aza-1-silabicyclo[3.3.3]undecane; or 1-(3-(oxiran-2-ylmethoxy)propyl)- 3,7,10-trimethylsilatrane After the functionalization reaction is completed, it will normally be desirable to "kill" any living polydiene chains which remain. This can be accomplished by adding an alcohol, such as methanol or ethanol, to the polymer cement after the functionalization reaction is completed in order to eliminate any living polymer that was not consumed by the reaction with the terminator of formula I. The end-group functionalized polydiene rubber can then be recovered from the solution utilizing standard techniques.

The invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this example, pilot scale polymerization of a non-functionalized elastomer is illustrated. Polymerizations were done in a 60-gallon reactor at 65° C. A premix of styrene and butadiene (113.5 kg, 12 wt %) was charged into reactor with hexane followed by addition of modifier (TMEDA, 39-43 mL) and initiator (n-butyllithium, 52-63 mL, 15 wt %). When the conversion was above 98%, the polymerization was terminated with isopropanol. The resulting non-functionalized elastomer was labeled as control Sample 1.

Example 2

In this example, pilot scale polymerization of an end-functionalized elastomer obtained using a functional initiator is illustrated.

Polymerizations were done in a 60-gallon reactor at 65° C. Monomer premix of styrene and butadiene (113.5 kg, 12 wt %) was charged into reactor with hexane as solvent followed by addition of modifier (TMEDA, 39-43 mL) and functional initiator (3-pyrrolidino-1-propyl lithium, 200-250 mL, 5.75 wt %). When the conversion was above 98%, the polymerization was terminated with isopropanol. The resulting monofunctionalized elastomer was labeled as comparative Sample 2.

Example 3

In this example, pilot scale polymerization of an end-functionalized elastomer obtained using a functional terminator is illustrated.

The functional terminator used in the polymerization was produced as follows. Triisopropanolamine (253.0 g, from Aldrich), tetraethylsilicate (289 g, from Aldrich) and potassium hydroxide (3.7 g, form Aldrich) were mixed in a 1-liter 3-neck round bottle flask equipped with distillation apparatus. The mixture was then heated to 85° C. by heating mantle, and ethanol produced from the reaction was removed under reduced pressure of 200 mmHg. After 2 hour of reaction the pressure was set to 100 mmHg, and the mixture was heated to 120° C. for an additional hour. Total of 230 mL of ethanol was recovered from the distillation. The oily crude product was then distilled out under the pressure of ~2 mmHg and the temperature of 120° C. Total of 305 g (88.2% yield) of white crystalline solid, 1-ethoxy-3,7,10-trimethylsilatrane (ESTI), was obtained. $^1$HNMR and $^{13}$CNMR spectroscopy analysis has shown greater than 95% purity of the desired product. m.p. 80-83° C.

Polymerizations of solution SBR were done in a 60-gallon reactor at 65° C. Monomer premix of styrene and butadiene (113.5 kg, 12 wt %) was charged into reactor with hexane as solvent followed by addition of modifier (TMEDA, 39-43 mL) and initiator (n-butyllithium, 52-63 mL, 15 wt %). When the conversion was above 98%, the polymerization was terminated with the functional terminator 1-ethoxy-3,7,10-trimethylsilatrane (ESTI). The resulting monofunctionalized elastomer was labeled as comparative Sample 3.

Example 4

This example illustrates pilot scale polymerization of a bifunctionalized elastomer functionalized at both chain ends. The bifunctionalized elastomer was obtained using a functional initiator and a functional terminator.

Polymerizations were done in a 60-gallon reactor at 65° C. Monomer premix of styrene and butadiene (113.5 kg, 12 wt %) was charged into reactor with hexane as solvent followed by addition of modifier (TMEDA, 39-43 mL) and functional initiator (3-pyrrolidino-1-propyl lithium, 200-250 mL, 5.75 wt %.) When the conversion was above 98%, the polymerization was terminated with functional terminator 1-ethoxy-3,7,10-trimethylsilatrane (ESTI). The resulting bifunctionalized elastomer was labeled as inventive Sample 4.

Example 5

The polymers of Examples 1 through 4 were characterized using different techniques, for example, size exclusion chromotography (SEC) for determination of molecular weight, dynamic scanning calorimetry (DSC, inflection at 10° C./min) for determination of Tg, IR for determining cis, trans, styrene and vinyl content, and Mooney viscosity measurements with results given in Tables 2 and 3. Sample 1, the nonfunctional SBR of Example 1, was labeled as control. Sample 2, the monofunctionalized SBR of Example 2 obtained using a functional initiator, was labeled as comparative. Sample 3, the monofunctionalized SBR of Example 3 obtained using a functional terminator, was labeled as comparative. Sample 4, the bifunctionalized SBR of Example 4 obtained using both a functional initiator and a functional terminator, represents the present invention.

TABLE 2

| Polymer Sample | Overall Mn (g/mol) | PDI |
|---|---|---|
| 1: SBR[1] (Control) | 225,000 | 1.02 |
| 2: PPL-SBR[2] (Comparative) | 354,000 | 1.46 |
| 3: ESTI-SBR[3] (Comparative) | 212,000 | 1.04 |
| 4: PPL-ESTI-SBR[4] (Invention) | 294,000 | 1.28 |

[1]Non-functionalized SBR, from Example 1
[2]Functionalized SBR initiated with pyrrolidino propyllithium (PPL), from Example 2
[3]Functionalized SBR terminated with 1-ethoxy-3,7,10-trimethylsilatrane (ESTI), from Example 3.
[4]Functionalized SBR initiated with PPL and terminated with ESTI, from Example 4.

TABLE 3

| Polymer Sample* | Mooney | Cis % | Trans % | Styrene % | Vinyl %[5] | Tg ° C. |
|---|---|---|---|---|---|---|
| 1: SBR (Control) | 71 | 16 | 15 | 20 | 49 | −23 |
| 2: PPL-SBR (Comparative) | 58 | 15 | 14 | 21 | 51 | −23 |
| 3: ESTI-SBR (Comparative) | 71 | 16 | 15 | 21 | 49 | −22 |
| 4: PPL-ESTI-SBR (Invention) | 64 | 15 | 14 | 20 | 51 | −22 |

[5]Vinyl content expressed as weight percent based on total polymer weight.
*Lower vinyl and lower Tg analog of these polymers were also synthesized, having a styrene content of about 18 percent, vinyl content of about 10 percent, and Tg of about −72° C.

While certain representative embodiments and details have been shown for the purpose of illustrating the subject invention, it will be apparent to those skilled in this art that various changes and modifications can be made therein without departing from the scope of the subject invention.

What is claimed is:

1. A bifunctionalized elastomer comprising the reaction product of 1) a living anionic elastomeric polymer initiated with a functional initiator and 2) a functional polymerization terminator, wherein
  1) the living anionic elastomeric polymer initiated with a functional initiator is of formula AYLi where Y is a divalent polymer radical, Li is a lithium atom bonded to a carbon atom of Y, and A is an amine-containing radical having the formula X

(X)

wherein $R^{15}$ and $R^{16}$ independently have from 1 to 20 carbon atoms and each are independently an alkyl group, a cycloalkyl group, an aromatic group, a substituted alkyl group, a substituted cycloalkyl group or a substituted aromatic group, or $R^{15}$ and $R^{16}$ taken together with the nitrogen to which both $R^{15}$ and $R^{16}$ are attached comprise a heterocyclic amine group wherein $R^{15}$ and $R^{16}$ taken together form an alkanediyl group of from 4 to 20 carbon atoms or a substituted alkanediyl group of from 4 to 20 carbon atoms, and $R^{17}$ is a covalent bond, an alkanediyl group of from 1 to 20 carbon atoms or a substituted alkanediyl group of from 1 to 20 carbon atoms; and 2) the functional polymerization terminator is of formula I

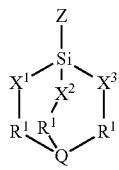
(I)

wherein R¹ is C1 to C4 linear alkyl, or C1 to C4 branched alkanediyl;

X¹, X², X³ are independently O, S, or a group of formula (II) or (III)

$$—\underset{|}{N}—R^2 \quad (II)$$

$$—\underset{|}{P}—R^2 \quad (III)$$

where $R^2$ is C1 to C18 linear or branched alkyl; Z is $R^3$, —$OR^4$, or —$R^5$—$X^4$; $R^3$, $R^4$ are independently C1 to C18 linear or branched alkyl; $R^5$ is C1 to C18 alkanediyl or dialkyl ether diyl; $X^4$ is halogen or a group of structure IV, V, VI, VII or VIII

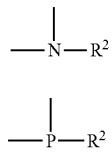
(IV)

(V)

(VI)

$$—\underset{|}{N}—R^{10}\phantom{R^9}$$
$$\phantom{—N—}R^9$$

(VII)

$$—N\!\!\diagdown\!\!\diagup\!R^{11}$$

(VIII)

$$—N\!=\!\underset{R^{13}}{\overset{R^{12}}{C}}$$

wherein $R^6$, $R^7$, $R^8$, $R^9$, and $R^{10}$ are independently H or C1 to C8 alkyl; $R^{11}$ is C2 to C8 alkanediyl; $R^{12}$ and $R^{13}$ are independently H, aryl or C1 to C8 alkyl; Q is N or a group of structure IX

(IX)

wherein $R^{14}$ is C1 to C8 alkyl.

2. The functionalized elastomer of claim 1, wherein the living anionic elastomer is derived from at least one diene monomer and optionally at least one vinyl aromatic monomer.

3. The functionalized elastomer of claim 1, wherein the living anionic elastomer is derived from at least one of isoprene and butadiene, and optionally from styrene.

4. The functionalized elastomer of claim 1, wherein the living anionic elastomer is derived from butadiene and styrene.

5. The functionalized elastomer of claim 1, wherein the polymerization terminator of formula I is ESTI, 1-ethoxy-3,7,10-trimethylsilatrane.

6. The functionalized elastomer of claim 1, wherein the polymerization terminator of formula I is CSTI, 1-(3-chloropropyl)-3,7,10-trimethylsilatrane.

7. The functionalized elastomer of claim 1, wherein the polymerization terminator of formula I is BSTI, 1-isobutyl-3,7,10-trimethylsilatrane.

8. The functionalized elastomer of claim 1, wherein the polymerization terminator of formula I is OSTI, 1-octyl-3,7,10-trimethylsilatrane.

9. The functionalized elastomer of claim 1, wherein the polymerization terminator of formula I is BIPOS, 1,2-bis(3,7,10-trimethylsilatrane)ethane.

10. The functionalized elastomer of claim 1, wherein the polymerization terminator of formula I is selected from the group consisting of the following structures

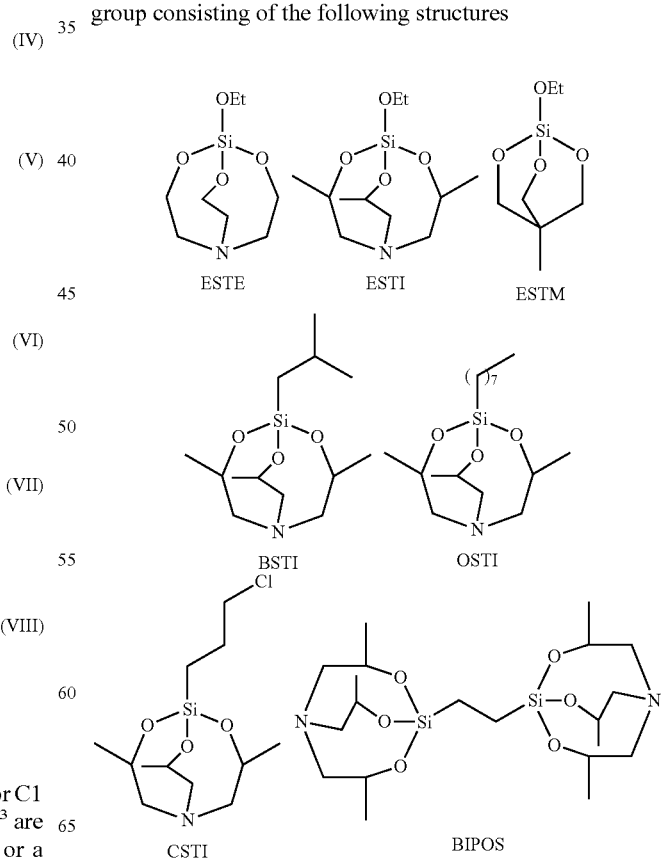

-continued

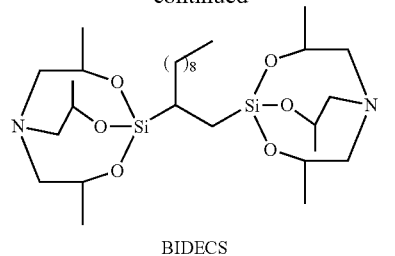

BIDECS

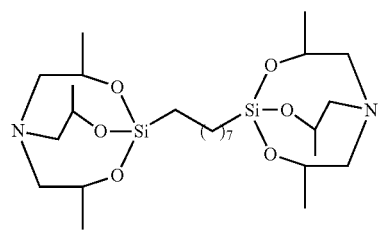

BIOCTS

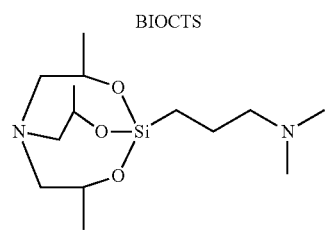

DIMASTI

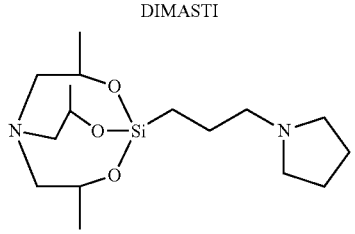

PYSTI

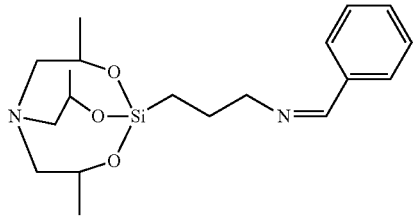 [SMILES: CC1CN2CC(C)O[Si](CCC/N=C\c3ccccc3)(O1)OC(C)C2]

BIMSTI

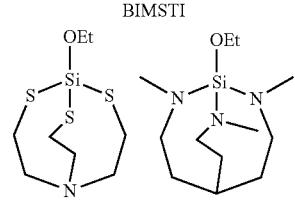

ETTS    ETAS

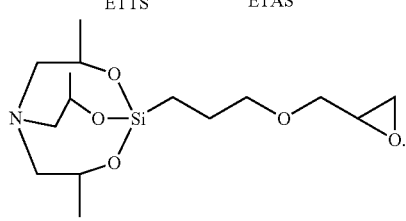

EPTI

11. The functionalized elastomer of claim 1, wherein the polymerization terminator of formula I has the structure

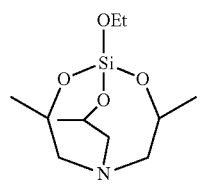

12. The functionalized elastomer of claim 1, wherein the polymerization terminator of formula I has the structure

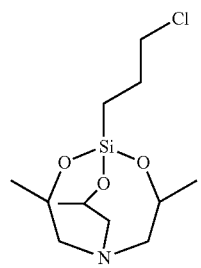

13. The functionalized elastomer of claim 1, wherein the polymerization terminator of formula I has the structure

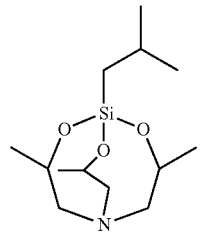

14. The functionalized elastomer of claim 1, wherein the polymerization terminator of formula I has the structure

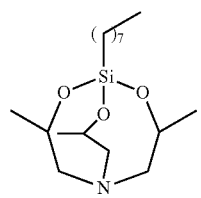

15. The functionalized elastomer of claim 1, wherein the structure of formula X is selected from the group consisting of 3-(N,N-dimethylamino)-1-propyl, 3-(N,N-dimethylamino)-2-methyl-1-propyl, 3-(N,N-dimethylamino)-2,2-dimethyl-1-propyl, 4-(N,N-dimethylamino)-1-butyl, 5-(N,N-dimethylamino)-1-pentyl, 6-(N,N-dimethylamino)-1-hexyl, and 8-(N,N-dimethylamino)-1-propyl.

16. The functionalized elastomer of claim 1, wherein the structure of formula X is selected from the group consisting of 3-piperidino-1-propyl and 3-pyrrolidino-1-propyl.

* * * * *